(12) United States Patent
Hattori

(10) Patent No.: US 6,779,546 B2
(45) Date of Patent: Aug. 24, 2004

(54) PRESSURE CONTROL VALVE FOR FUEL TANK

(75) Inventor: Toshio Hattori, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/419,198

(22) Filed: Apr. 21, 2003

(65) Prior Publication Data

US 2004/0007262 A1 Jan. 15, 2004

(30) Foreign Application Priority Data

Jul. 10, 2002 (JP) .......................................... 2002-200866

(51) Int. Cl.$^7$ ............................................. F16K 17/194

(52) U.S. Cl. .................................... 137/202; 137/493.1

(58) Field of Search ............................. 137/202, 493.1, 137/493.8, 493.9

(56) References Cited

U.S. PATENT DOCUMENTS 5,666,989 A * 9/1997 Roetker ...................... 137/202

* cited by examiner

Primary Examiner—Gerald A. Michalsky

(57) ABSTRACT

A pressure control valve includes a valve chamber having the first communicating portion connected to a canister and the second communicating portion connected to a fuel tank, the first valve member disposed inside the valve chamber, and the second valve member disposed inside the first valve member. The first valve member includes a valve portion for blocking the second communicating portion, the first communicating hole passing through the valve portion, and the second communicating hole communicating between the first valve member and the valve chamber. The second valve member blocks the second communicating hole. When the fuel tank reaches a certain high pressure state, the first valve member rises to open the second communicating portion. When the fuel tank reaches a certain low pressure state, the second valve member rises to open the second communicating hole.

6 Claims, 4 Drawing Sheets

PRESSURE CONTROL VALVE FOR FUEL TANK

BACKGROUND OF THE INVENTION AND RELATED ART STATEMENT

The present invention relates to an improvement of a pressure control valve to be provided in a ventilation path between a fuel tank and a canister for controlling an internal pressure of the fuel tank.

Japanese Patent Publication (Tokkai) No. 09-60744 discloses a pressure control valve (also called as a check valve, etc.) to be provided inside a ventilation path between a fuel tank and a canister for controlling an internal pressure of the fuel tank.

Such a conventional valve includes the first body, the second body, a positive pressure valve body, the first spring for urging the positive pressure valve, a negative pressure valve body, and the second spring for urging the negative pressure valve. That is, the conventional valve has relatively many parts, thereby requiring extra labor for assembly and making it difficult to reduce a cost.

In view of the problems of the conventional valve, an objective of the present invention is to provide a pressure control valve for a fuel tank with a minimal number of parts. The control valve opens properly a ventilation path between the canister and fuel tank when an inner pressure of the fuel tank reaches a high pressure level or a low pressure level.

Further objects and advantages of the invention will be apparent from the following description of the invention.

SUMMARY OF THE INVENTION

In order to achieve the above-mentioned objectives, in the present invention, a pressure control valve for a fuel tank includes a valve chamber providing the first communicating portion communicating with a ventilation path to a canister and the second communicating portion communicating with the fuel tank; a hollow first valve member disposed in the valve chamber to be movable up and down; and a second valve member disposed inside the first valve member to be movable up and down. At a bottom of the first valve member, there are provided a valve member for blocking the second communicating portion from inside the valve chamber, the first communicating hole passing through the valve member, and the second communicating hole formed at a position different from the first communicating hole for connecting between inside the first valve member and the valve chamber. Further, the second valve member is arranged to block the second communicating hole from the inside the first valve member, and the first valve member rises to open the second communicating portion when an inner pressure of the fuel tank reaches a certain high level, and also the second valve member rises to open the second communicating hole when the inner pressure of the fuel tank reaches a certain low level.

According to this configuration, when the pressure inside the fuel tank is within a predetermined range, in other words, the fuel tank is not in a certain high or low pressure state, the first valve member closes the second communicating portion from the inside of the valve chamber by its own weight, and at the same time, the second valve member closes the second communicating hole from the inside of the first valve member by its own weight, so that the canister does not communicate with the fuel tank.

When the inner pressure of the fuel tank reaches the predetermined high level, an upward pressure toward the first valve member is applied to a bottom of the first valve member through the second communicating portion, thereby rising the first valve member to open the second communicating portion, so that the canister communicates with the fuel tank.

Further, when the inner pressure of the fuel tank reaches the predetermined low level, the upward pressure toward the second valve member is applied to the second valve member through the second communicating hole, thereby rising the second valve member to open the second communicating hole, so that the canister communicates with the fuel tank through the inside of the first valve member and the first communication hole while the first valve member is still at a low position.

That is, it is possible to construct the valve having the above-mentioned pressure controlling function only with the first valve member including the second valve member inside the valve chamber. Thus, the valve can be formed of a minimal number of the parts.

Also, in the pressure control valve for the fuel tank of the present invention, at least one of the first valve member and the second valve member can open the valve through a vibration of the running vehicle. With this configuration, even when the pressure inside the fuel tank is within the range of the pressure where the first valve member and second valve member are not raised, the canister communicates with the fuel tank as needed.

In addition, the pressure control valve for the fuel tank of the present invention includes a lower chamber disposed inside the fuel tank with a bottom of the valve chamber as a top wall of the lower chamber. The valve chamber communicates with the lower chamber through the second communicating portion. Further, a float member is disposed in the lower chamber and constitutes a cut valve for blocking the second communicating portion from the lower chamber side when the fuel flows into the lower chamber to raise the float member.

With this configuration, the cut valve with the function for controlling the inside pressure of the fuel tank through the first valve member and the second valve member can be constituted with a minimal number of the parts.

DETAILED DESCRIPTION OF PREFERRED EMBODIMENTS

Figure 1:
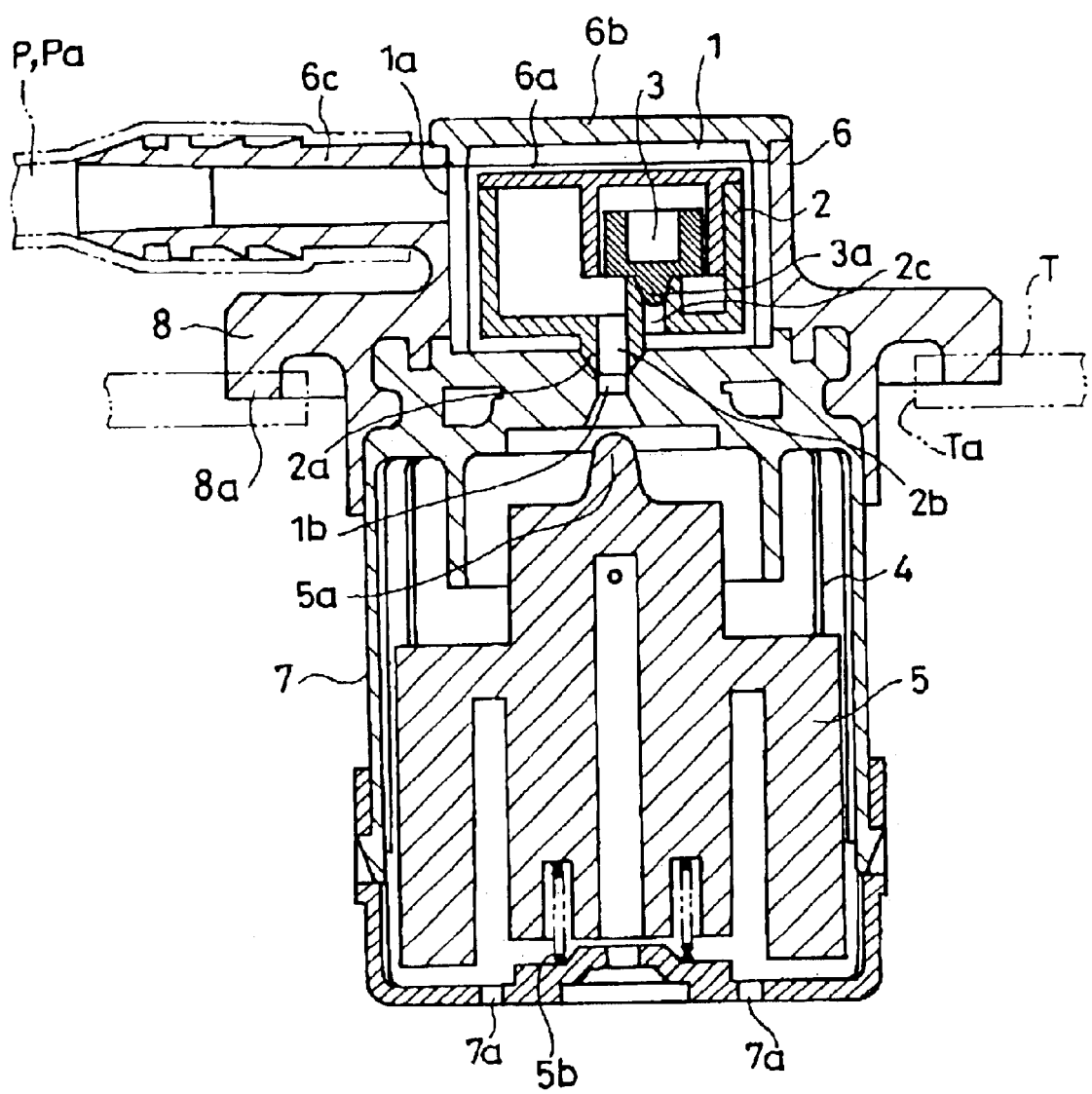
FIG. 1 is a cross sectional view showing a configuration of a cut valve using a valve of the present invention.
Figure 2:
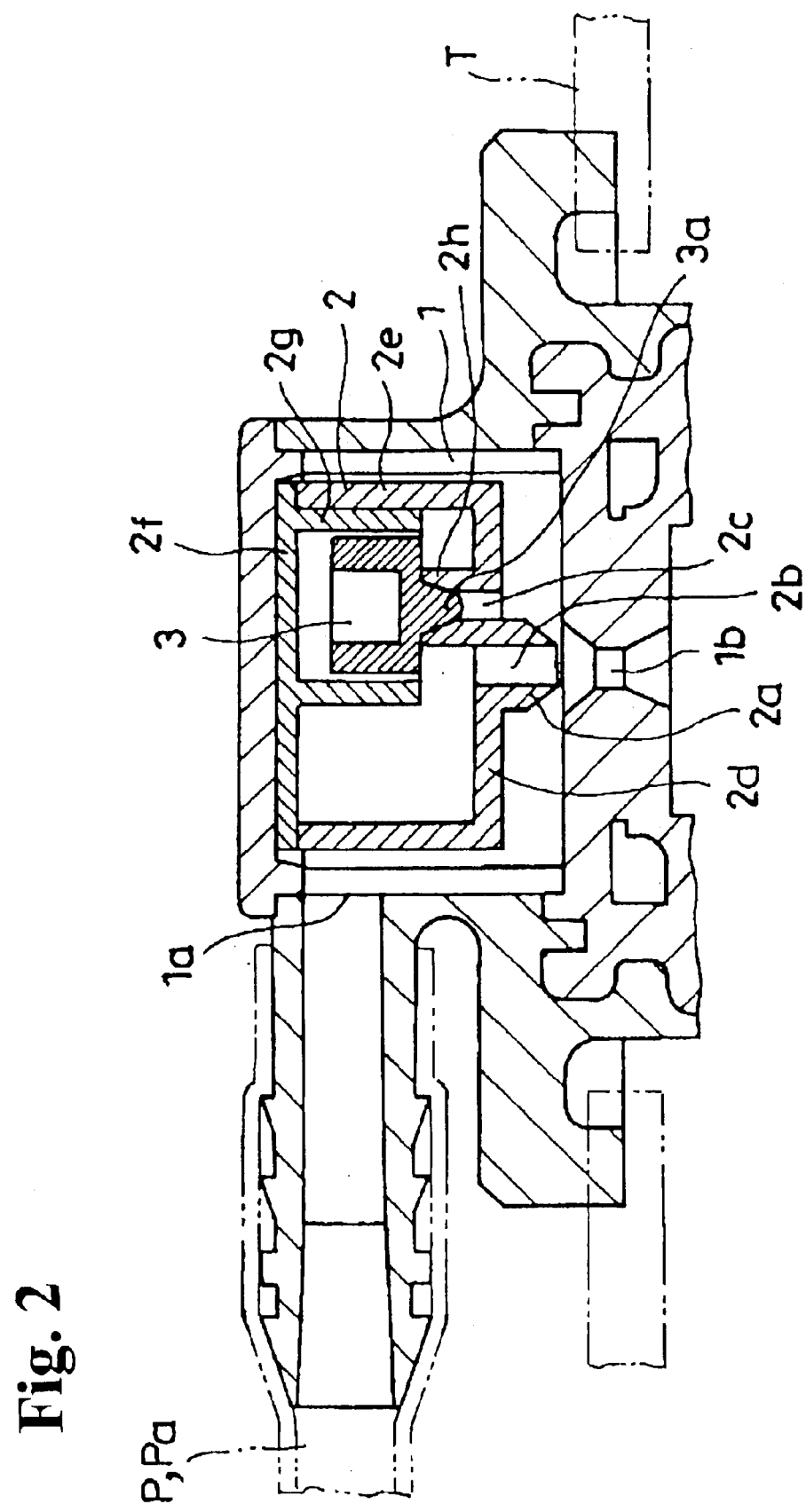
FIG. 2 is a cross sectional view showing an essential part of the embodiment.
Figure 3:
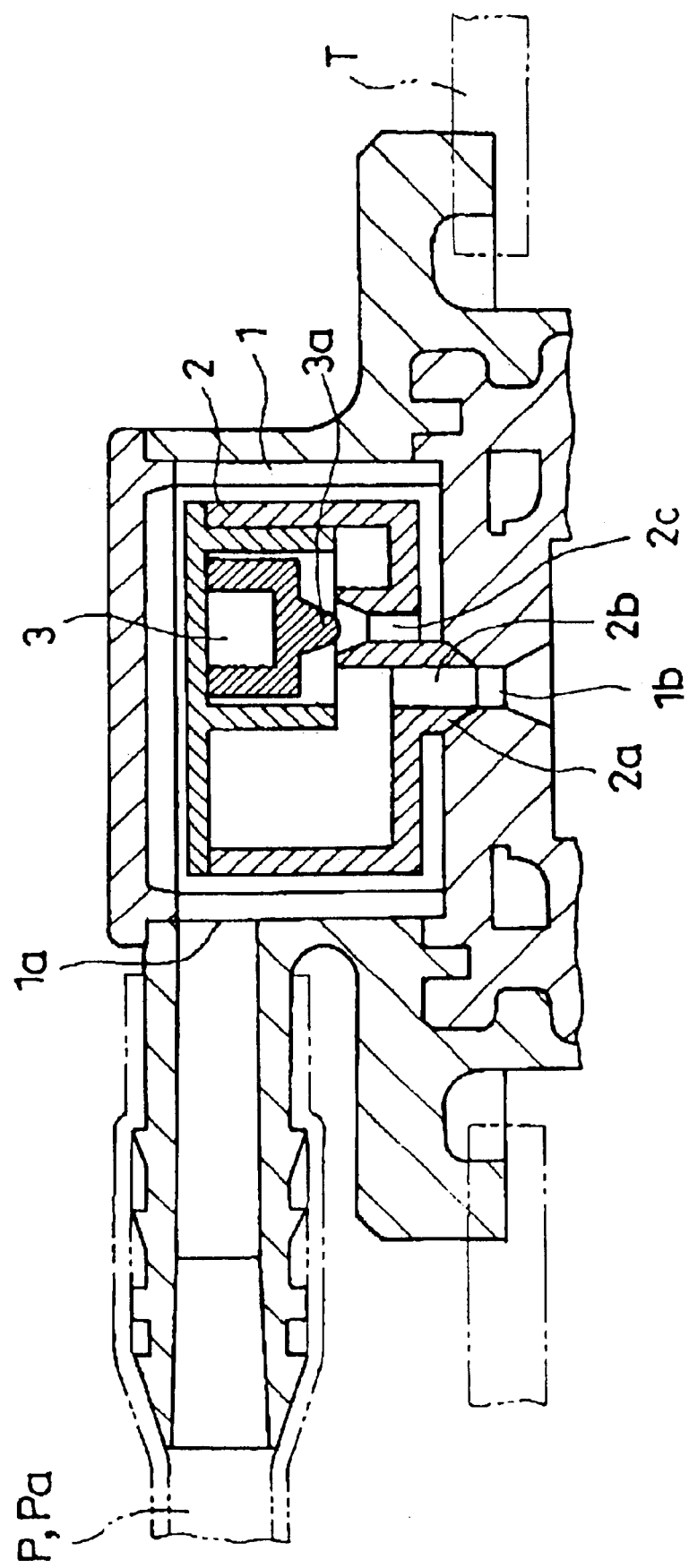
FIG. 3 is a cross sectional view showing an essential part of the embodiment.

Hereunder, embodiments of the present invention will be explained with reference to the accompanying drawings. FIGS. 1 and 3 show a configuration of a cut valve using a valve of the present invention. FIG. 2 shows a state that the first valve member 2 is raised when an internal pressure of the fuel tank T reaches a certain high level. FIG. 3 shows a state that the second valve member 3 is raised when the internal pressure of the fuel tank T reaches a certain low level. When the fuel tank T communicates with the canister and the pressure inside the fuel tank T decreases or increases, as shown in FIGS. 2 and 3, the cut valve returns to the state shown in FIG. 1.

Figure 4:
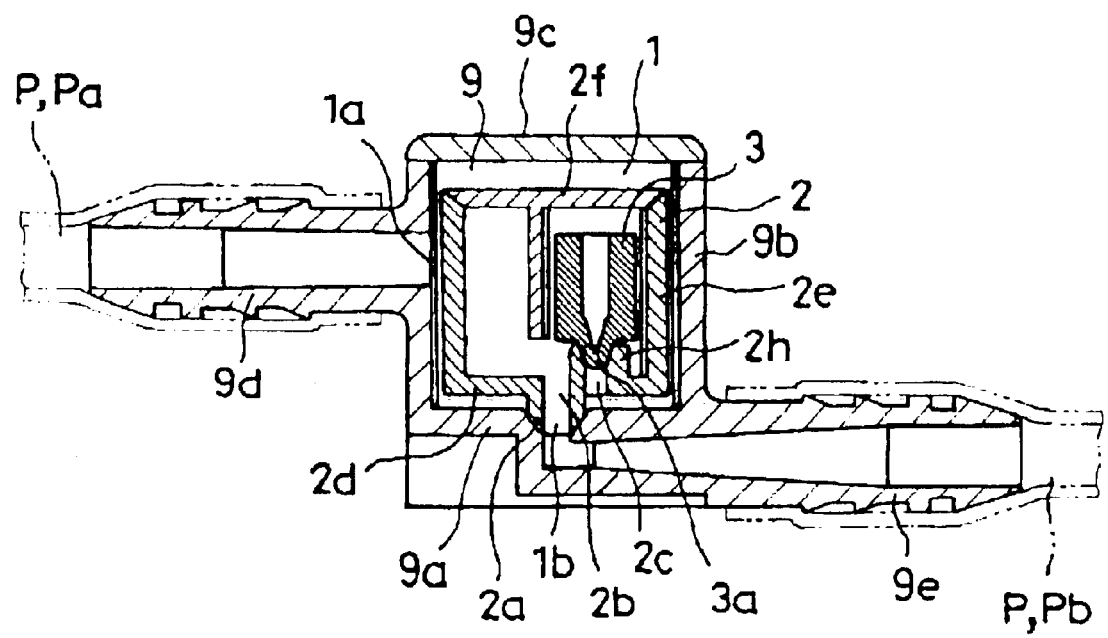
FIG. 4 is a cross sectional view showing an embodiment in which the valve of the present invention is arranged outside a fuel tank as a valve installed in a ventilation path between a canister and fuel tank.

Also, FIG. 4 shows an embodiment in which the valve of the invention is placed outside the fuel tank T as a valve provided inside the ventilation path P between the canister and the fuel tank T for controlling the pressure inside the fuel tank T. The valve according to the embodiment is provided inside the ventilation path p between the fuel tank T and the canister for controlling the pressure of the fuel tank T.

The valve includes the first communicating portion $1a$ communicating with the ventilation path P of the canister, and the valve chamber 1 including the second communicating portion $1b$ communicating with the fuel tank T. When the inside of the fuel tank T reaches a certain high pressure state or a certain low pressure state, the first communicating portion $1a$ communicates with the second communicating portion $1b$ through the valve chamber 1, so that the pressure inside the fuel tank T is maintained within a predetermined range.

More specifically, when the inside of the fuel tank T reaches a certain high or low pressure state, the first communicating portion $1a$ communicates with the second communicating portion $1b$ through the valve chamber 1, so that the pressure inside the fuel tank T is maintained in a predetermined range. When the inside of the fuel tank T reaches a certain high pressure state, the first communicating portion $1a$ communicates with the second communicating portion $1b$ through the valve chamber 1 to release a gas inside the fuel tank T to the canister, thereby reducing the pressure inside the fuel tank T. When the inside of the fuel tank T reaches a certain low pressure state, the first communicating portion $1a$ communicates with the second communicating portion $1b$ through the valve chamber 1 to allow the gas to flow into the fuel tank T from the canister, thereby increasing the pressure inside the fuel tank T.

As shown in FIG. 4, such a valve is typically placed outside the fuel tank T, and is provided inside the ventilation path P between the canister and the fuel tank T to control the pressure inside the fuel tank.

Also, as shown in FIG. 1, the valve may be attached to an attachment hole Ta formed in the fuel tank T to block the same from the outside of the fuel tank T to control the pressure inside the fuel tank. Further, the valve may be attached to an upper part of a sender module (a unit member formed of a supply pump, fuel gauge, suction filter, fuel filter, and the like, to be disposed inside the fuel tank T) to control the pressure inside the fuel tank.

The valve includes a hollow first valve member 2 disposed in the valve chamber 1 to be movable up and down, and a second valve member 3 disposed inside the first valve member to be movable up and down. At a bottom $2d$ of the first valve member 2, there are provided a valve member $2a$ for blocking the second communicating portion $1b$ from the inside the valve chamber 1, the first communicating hole $2b$ passing through the valve member $2a$, and the second communicating hole $2c$ formed at a position different from the first communicating hole $2b$ for connecting between the inside of the first valve member 2 and the valve chamber 1. The second valve member 3 is configured to block the second communicating hole $2c$ from the inside of the first valve member 2. Further, the first valve member 2 rises to open the second communicating portion $1b$ when the inner pressure of the fuel tank T reaches a certain high level, and also the second valve member 3 rises to open the second communicating hole $2c$ when the inner pressure of the fuel tank T reaches a certain low level.

With the configuration described above, when the pressure inside the fuel tank T is within the predetermined pressure range, in other words, when the pressure is not a certain high level or a certain low level, the first valve member 2 blocks the second communicating portion $1b$ from the inside of the valve chamber 1 by its own weight. Also, the second valve member 3 blocks the second communicating hole $2c$ from the inside of the first valve member 2 by its own weight as well, so that the canister does not communicate with the fuel tank T.

When the pressure inside the fuel tank T reaches a certain high level, the first valve member 2 rises due to the upward pressure acting on the bottom portion $2d$ of the first valve member 2 through the second communicating portion $1b$ to open the second communicating portion $1b$, so that the canister communicates with the fuel tank T. Further, when the pressure inside the fuel tank T reaches a certain low level, the second valve member 3 rises due to the upward pressure acting upon the bottom of the second valve member 3 through the second communicating hole $2c$ to open the second communicating hole $2c$. Therefore, the canister communicates with the fuel tank T through the inside of the first valve member 2 and the first communicating hole $2b$ while the first valve member 2 stays in a low position.

It is possible to adjust a level of the upward pressure for raising the first valve member 2 by controlling a weight of the first valve member 2 and a size of the second communicating portion $1b$. Also, It is possible to adjust a level of the upward pressure for raising the second valve member 3 by controlling a weight of the second valve member 3 and a size of the second communicating hole $2c$.

For example, the valve may be adjusted so that the first valve member 2 rises when the pressure inside the fuel tank T becomes above 3.60 kPa, and the second valve member 3 rises when the pressure inside the fuel tank T becomes below 1.33 kPa. In that case, the pressure inside the fuel tank T can be maintained in a range from 1.33 kPa to 3.60 kPa.

The valve can be provided with such a pressure control function just through disposing the first valve member 2 with the second valve member 3 inside the valve chamber 1, thereby reducing the number of the parts.

In addition, at least one of the first valve member 2 and the second valve member 3 may be arranged to open the valve by the vibration of a running vehicle. In this case, even if the pressure inside the fuel tank T is in the pressure range in which the first valve member 2 and the second valve member 3 do not rise, the canister can communicate with the fuel tank T as needed.

With such a configuration, it is possible to prevent hydrocarbon from releasing to the environment. The hydrocarbon is included in a fuel gas (also referred as fuel steam) generated from the fuel inside the fuel tank T, and is said to have an adverse effect to the environment. However, the hydrocarbon easily permeates through a plastic, therefore, it is difficult to completely keep the hydrocarbon inside the fuel tank T made of a resin. Also, it is difficult to completely stop the hydrocarbon from leaking through openings of connecters such as various types of pipes and tubes connected to the fuel tank T. Thus, it is preferred that the fuel tank T communicates with the canister to an extent in which no serious problem occurs.

For example, the first valve member 2 may be supported inside the valve chamber 1 to slide up and down, so that the first valve member 2 can open the valve by the vibration of the running vehicle. Also, the second valve member 3 may be supported inside the second valve member 2 to slide up and down, so that the second valve member 3 can open the valve by the vibration of the running vehicle.

In the case that the valve is configured as shown in the drawings, the second valve member 3 may be formed in a sphere such as a metal ball for blocking the second communicating hole 2c by its own weight. Thus, the second valve member 3 can smoothly repeat opening and closing the valve by the vibration of the running vehicle.

FIGS. 1 and 3 show the first embodiment in which the above-mentioned valve is applied to a cut valve. According to the first embodiment, the valve includes a lower chamber 4 disposed in the fuel tank T with a bottom of the valve chamber 1 as a top wall of the lower chamber. Also, the valve chamber 1 communicates with the lower chamber 4 through the second communicating portion 1b.

At the same time, a float member 5 constituting the cut valve is stored inside the lower chamber 4. The float member 5 rises to block the second communicating portion 1b from the lower chamber 4 side when the fuel flows into the lower chamber 4.

In the embodiment, the cut valve has the pressure control function through the first valve member 2 and the second valve member 3, and can be constructed with a minimal number of the parts. The cut valve is provided with an upper portion 6 having the valve chamber 1 inside thereof and a lower portion 7 constituting the lower chamber 4. A circular flange 8 made of a plastic is formed at a joint between the upper portion 6 and the lower portion 7. A projection 8a for welding is formed and projected downward on an outer periphery of the flange 8.

The lower portion 7 is inserted into the hole Ta, which is provided in the fuel tank T and has a diameter smaller than an outer diameter of the flange 8, from the outside of the fuel tank T. Then, the projection 8a is heated and welded to an outer surface around the hole Ta, so that the cut valve is attached to the fuel tank T in a state that the flange 8 closes the hole Ta.

In the embodiment, the valve chamber 1 is formed at the upper portion 6 with an opening of the depressed portion 6a closed by a cover plate 6b in an airtight condition. The first communicating portion 1a is formed on a side of the valve chamber 1, and the second communicating portion 1b is formed at roughly the center of the bottom of the valve chamber 1.

Also, in the embodiment, a connecting pipe 6c projects outward from a side of the upper portion 6, and a base of the connecting pipe 6c is formed in the first communicating portion 1a. The connecting pipe 6c is inserted into a tube Pa connected to the canister from an end thereof, so that the canister communicates with the valve chamber 1 through the first communicating portion 1a.

The first valve member 2 is formed in a hollow body having a bottom portion 2d, a side portion 2e, and a top portion 2f. In this embodiment, the top portion 2f having a plate shape closes an opening of a cup body formed of the bottom portion 2d and the side portion 2e integrated with the bottom portion 2d in an airtight condition, thereby constituting the first valve member 2.

A valve member 2a having a cylindrical shape with two open ends is disposed at the bottom portion 2d of the first valve member 2, and one of the two ends is integrated with the bottom portion 2d and projects downward. The one end of the valve member 2a communicates with an inside space of the first valve member 2. The first communicating hole 2b is formed inside the valve member 2a, and a hole formed in the valve chamber 1 at a position corresponding to the second communicating portion 1b has a cone shape with an inner hole diameter increasing upwardly. The valve member 2a of the first valve member 2 fits in the hole by a weight of the first valve member 2 to block the second communicating portion 1b from the valve chamber 1 side. The first valve member 2 has a vertical dimension and a horizontal dimension smaller than those of the valve chamber 1.

With the configuration described above, when the top portion 2f of the first valve member 2 abuts against an inner surface of the cover plate 6b of the upper portion 6 of the valve chamber 1, the valve member 2a moves out of the first communicating portion 1a. Thus, the first communicating portion 1a communicates with the second communicating portion 1b through a gap between an outer surface of the side portion 2e of the first valve member 2 and an inner surface of the valve chamber 1, so that the canister communicates with the fuel tank T (FIG. 2).

Also, a supporting portion 2h for the second valve member 3 is formed at a side of the first communicating hole 2b of the first valve member 2. The supporting portion 2h has two open ends, and a lower end thereof is integrated with an inner surface of the bottom portion 2d of the first valve member 2, and projects upward. The lower end of the supporting portion 2h of the second valve member 3 communicates with outside of the first valve member 2, i.e. the inner valve chamber 1. In other words, in the embodiment, the second communicating hole 2c is formed of the supporting portion 2h of the second valve member 3.

The second valve member 3 has a short cylinder shape with a closed lower end and an open upper end. A projecting valve member 3a projecting downward is formed at a bottom of the second valve member 3. The valve member 3a of the second valve member 3 fits in the second communication hole 2c by a weight of the second valve member 3 to blocks the second communicating hole 2c from the first valve member 2 side.

The second valve member 3 is stored inside a cylindrical member 2g projecting downward from the top portion 2f of the first valve member 2. An inner wall of the cylindrical member 2g guides the second valve member 3 so that the valve member 3a enters the supporting portion 2h.

The second valve member 3 has a vertical dimension smaller than a distance between an end of the supporting portion 2h of the first valve member 2 and the inner surface of the top portion 2f. When the top end of the second valve member 3 abuts against the inner surface of the top portion 2f of the first valve member 2, the valve member 3a moves out of the supporting portion 2h, i.e. the second communicating hole 2c. Accordingly, the gas enters the valve chamber 1 from the canister side through a gap between the outer surface of the side portion 2e of the first valve member 2 at the lower position and the inner surface of the side part of the valve chamber 1. Further, the gas enters the first valve member 2 through the second communicating hole 2c, and then flows to the fuel tank T through the first communicating hole 2b (FIG. 3).

The lower portion 7 of the lower chamber 4 has a closed cylindrical shape with a top end integrated with the upper portion 6 and a bottom end closed with a cover. A fuel inflow hole 7a is provided in the lower portion 7 as needed.

The float member 5 composing the cut valve is disposed inside the lower portion 7 with the above-structure to be movable up and down. A projecting valve member 5a is formed at a top of the float member 5. When the float member 5 moves upward, the projecting valve member 5a enters the hole of the second communicating portion 1b from the lower chamber 4 side to prevent the fuel from entering through the second communicating portion 1b. A symbol 5b in FIG. 1 denotes a coil spring for urging the float member 5 upward when the fuel flows into the lower chamber 4. In addition, when the vehicle is tilted, the coil spring allows the float member 5 to rise to block the second communicating portion 1b from the lower chamber 4 side.

FIG. 4 shows the second embodiment as an example in which the valve is provided in the ventilation path P between the canister and the fuel tank T outside the outer fuel tank T. In the embodiment, the valve chamber 1 is formed of a cup member 9 having a bottom portion 9a, side portion 9b, and cover plate 9c. The side portion 9b is integrated with the bottom portion 9a, and the cover plate 9c closes an upper opening in an airtight condition.

A connecting pipe 9d projecting outward is provided on the side portion 9b, and a base of the connecting pipe 9d is formed in the first communicating portion 1a. The connecting pipe 9d is inserted in the tube Pa connected to the canister from an end thereof, so that the canister communicates with the valve chamber 1 through the first communicating portion 1a.

In addition, a connecting pipe 9e projecting outward is provided on the bottom portion 9a, and a base of the connecting pipe 9e is formed in the second communicating portion 1b. The connecting pipe 9e is inserted in the tube Pb connected to the fuel tank T from an end thereof, so that the fuel tank T communicates with the valve chamber 1 through the second communicating portion 1b.

In the second embodiment, other structures and functions of the valve chamber 1, the first valve member 2, and the second valve member 3 are the same or substantially the same as those in the first embodiment. Therefore, the same symbols used for the first embodiment in FIGS. 1 and 3 are used for the same or substantially the same structural components of the second embodiment in FIG. 4, and the explanations are omitted.

According to the present invention, when the inside of the fuel tank reaches a certain high pressure state, or a certain low pressure state, the pressure control valve for the fuel tank opens appropriately to secure the communication between the canister and fuel tank. Further, the pressure control valve of the invention is formed of a minimal number of the parts.

While the invention has been explained with the specific embodiments of the invention, the explanation is illustrative and the invention is limited only by the appended claims.

What is claimed is:

1. A pressure control valve for a fuel tank, comprising:
   a valve chamber having a first communicating portion communicating with a canister and a second communicating portion communicating with the fuel tank,
   a first valve member having a hollow body and disposed inside the valve chamber to be moved vertically, said first valve member having a valve portion at a bottom for closing the second communicating portion from an inside of the valve chamber at a lower position thereof, a first communicating hole passing through the valve portion, and a second communicating hole at a position different from the first communicating hole for communicating between an inside of the hollow body and the valve chamber, and
   a second valve member disposed inside the hollow body to be moved vertically for closing the second communicating hole from an inside of the first valve member at a lower position thereof so that when an inner pressure of the fuel tank becomes above a predetermined high level, the first valve member rises to open the second communicating portion, and when the inner pressure of the fuel tank becomes below a predetermined low level, the second valve member rises to open the second communicating hole.

2. A pressure control valve according to claim 1, wherein at least one of said first valve member and second valve member is arranged to open the second communicating portion or the second communicating hole corresponding thereto when the fuel tank vibrates.

3. A pressure control valve according to claim 1, wherein said second communicating portion has an upper opening formed in a cone shape for receiving the valve portion of the first valve member, and said second communicating hole has an upper opening formed in a cone shape for receiving the second valve member.

4. A pressure control valve according to claim 1, wherein said second communicating hole is located above the valve portion so that when the valve portion closes the second communicating portion, the second communicating hole communicates with the first communicating portion.

5. A pressure control valve according to claim 1, further comprising a lower chamber disposed below the valve chamber and communicating with the valve chamber through the second communicating portion, said lower chamber having a float member therein so that when a fuel flows into the lower chamber, the float member rises to close the second communicating portion from a lower chamber side.

6. A pressure control valve according to claim 5, further comprising a flange portion at an upper periphery of the lower chamber to be welded onto an outer surface of the fuel tank.

* * * * *